N. ZINK.
Bee-Hive.

No. 212,828. Patented Mar. 4, 1879.

WITNESSES
Villette Anderson
Walter C. Masi

INVENTOR
Nathaniel Zink
By E. W. Anderson
ATTORNEY

UNITED STATES PATENT OFFICE.

NATHANIEL ZINK, OF UNION STAR, MISSOURI.

IMPROVEMENT IN BEE-HIVES.

Specification forming part of Letters Patent No. 212,828, dated March 4, 1879; application filed July 27, 1878.

*To all whom it may concern:*

Be it known that I, NATHANIEL ZINK, of Union Star, in the county of De Kalb and State of Missouri, have invented a new and valuable Improvement in Bee-Hives; and I do hereby declare that the following is a full, clear, and exact description of the construction and operation of the same, reference being had to the annexed drawings, making a part of this specification, and to the letters and figures of reference marked thereon.

Figure 1:
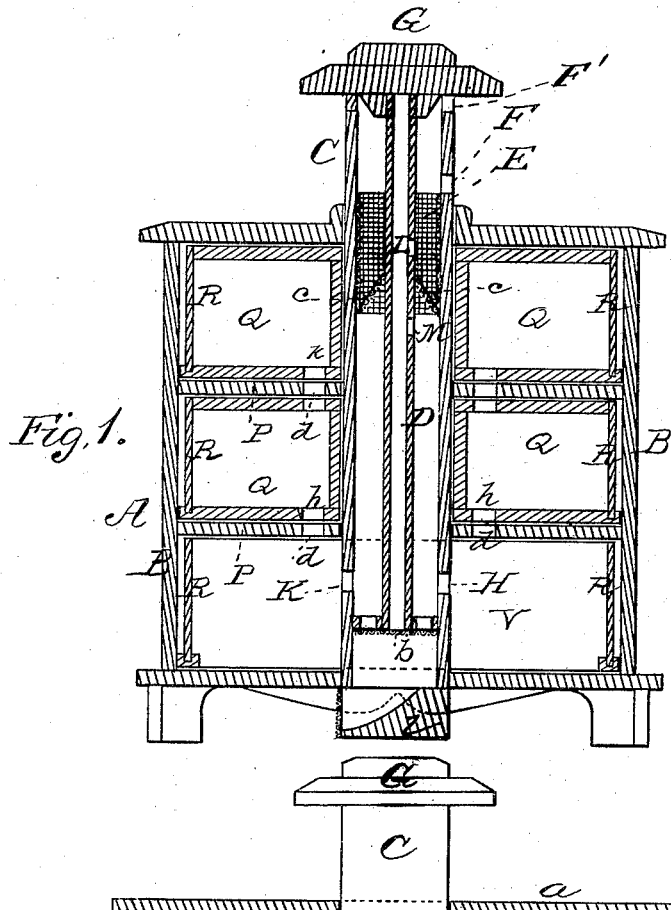
Figure 2:
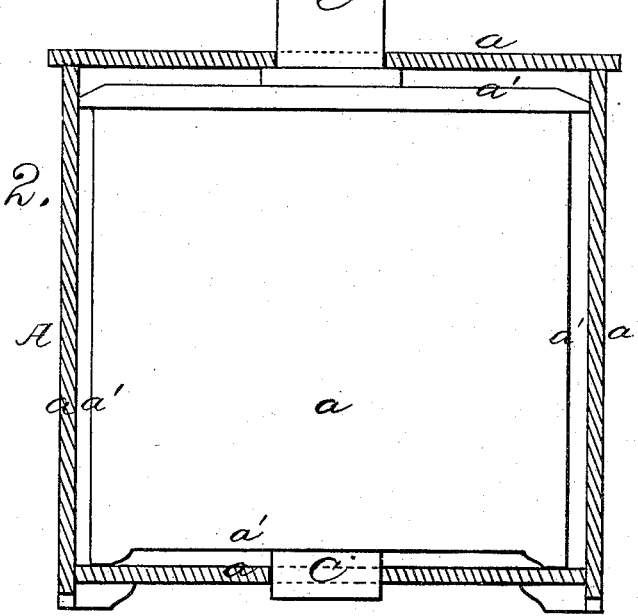

Figure 1 of the drawings is a representation of a vertical section of my improved hive, and Fig. 2 is a section of the outside wall, showing the dead-air space between said wall and the hive proper.

This invention has relation to improvements in bee-hives.

The object of the invention is to devise means whereby the hive will be adequately ventilated and moths prevented from penetrating into it.

The nature of the invention consists in combining with a hive-box having communicating horizontal compartments a ventilating-tube projecting above and extending through said box, and provided with orifices leading into the lowest chamber of the hive, and outside entrance-openings above the hive a smaller tube inside the ventilator, having at its lower end a gauze-covered perforated plate, and provided inside of the hive with spaced orifices, and a box-trap fitting in the ventilator, embracing the smaller tube, and arranged intermediate the openings therein, whereby the results desired are effectually attained, as will be hereinafter more fully set forth.

In the annexed drawings, the letter A designates a rectangular structure, having on two sides and at top and bottom the double walls $a\ a'$, forming a dead-air space with each other, as a precautionary measure against the effects of extreme heat and cold, and provided at the other two sides with hinged doors B, through which access is had to the interior of the said hive structure. These doors may be also double if I so elect.

I do not, however, limit my improvements to use in connection with a double-walled hive, as in mild climates they are not requisite to the welfare and comfort of the bees.

C is a tube extending completely through the top and bottom of the hive and extending several inches above the same. This tube serves the double purpose of ventilating the hive and of affording a bee-entrance thereto. Within this is a second tube, D, of less diameter, that extends downward nearly to the lower end of the tube C, and is provided upon its lower end with a perforated block, $b$, covered with wire-gauze and fitting snugly in the said tube C. This latter tube communicates with the lower chamber of the hive by means of openings K H, formed in opposite sides of the same, and the inner tube, D, is provided, just below the top of the hive, with the spaced orifices L M, between which is the moth-trap E. This is simply a wire-gauze box, fitting snugly in tube C and embracing the inner tube D, the top of which box is open and above the opening M in the latter, and is provided with an inverted-funnel-shaped bottom, $c$.

Bees enter the hive through the entrance-opening F, pass downward into box E, thence through opening L into tube D, passing down which they emerge into the space between the said tubes, below the moth-trap, through opening M. Going downward they enter the hive through the openings K H in the tube C, and circulate freely in every part of the hive. This is divided by horizontal partitions P into a number of compartments, in which are placed drawers Q, having glass fronts, and designed to receive the comb. These drawers have holes $k$ in their bottoms in line with corresponding holes $d$ in partitions, so that when the bees have once entered the lower or brood chamber, V, they may pass upward into any part of the hive. These drawers are readily removable when full, and this condition is ascertained at a glance by opening the doors B, because of their glass fronts R.

The tubes C D are closed by a cap, G, to which the said tube D is secured, and under said cap in tube C is an opening, F'. Moths can only enter the hive through opening F, and, as it is their habit to ascend when decoyed by light, they pass out through the opening F'. Should the miller fall he is caught by the trap E, and, being allured by the light entering through openings F F', immediately ascends and passes out through one of the said openings, not discerning in the obscurity the opening L. In the event of his finding this opening and passing into the tube D, he is still cut off from access to the hive, and will either return through said opening and leave the hive, as aforesaid, or ascend to the top of said tube and die of want. The bottom of tube D is partly closed by a block, $l$, and the reduced aperture thus formed is closed by a wire-gauze screen, or it may be left open in mild weather to secure better ventilation, as the wire-gauze covered block $b$ will effectually prevent access of moths to the hive, being below the openings H K in tube C leading thereinto.

What I claim as new, and desire to secure by Letters Patent, is—

1. In a bee-hive, the combination, with a hive-box, A, having communicating horizontal compartments, of a ventilating-tube extending through and projecting above said box, and provided with inside openings H K and outside openings F F', a tube, D, inside of tube C, provided with a gauze-covered perforated plate, $b$, on its lower end, and spaced openings L M inside of the hive, and a wire-gauze box, E, fitting tube C, embracing tube D, and arranged in the space between said tubes, substantially as specified.

2. The combination, with the box A, having horizontal compartments, and a ventilating-tube, E, provided with entrances F F' and exit-openings K H, of a tube, D, having perforated gauze-covered plate $b$, openings L M, and reticulated box E in the space between said tubes above opening M, and in line with opening L, substantially as specified.

In testimony that I claim the above I have hereunto subscribed my name in the presence of two witnesses.

NATHANIEL ZINK.

Witnesses:
  F. M. MAHAN,
  S. R. OWEN.